United States Patent
Chen

(10) Patent No.: US 9,787,748 B2
(45) Date of Patent: Oct. 10, 2017

(54) METHOD FOR EVALUATING STREAMING MEDIA TRANSMISSION QUALITY AND OBTAINING INFORMATION, AND RELATED DEVICE AND SYSTEM

(71) Applicant: Huawei Technologies Co., Ltd., Shenzhen (CN)

(72) Inventor: Bing Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 663 days.

(21) Appl. No.: 14/261,677

(22) Filed: Apr. 25, 2014

(65) Prior Publication Data

US 2014/0237112 A1    Aug. 21, 2014

Related U.S. Application Data

(63) Continuation of application No. PCT/CN2012/084076, filed on Nov. 5, 2012.

(30) Foreign Application Priority Data

Nov. 4, 2011 (CN) .......................... 2011 1 0345066

(51) Int. Cl.
*G06F 15/16* (2006.01)
*H04L 29/06* (2006.01)
(Continued)

(52) U.S. Cl.
CPC ........ *H04L 65/608* (2013.01); *H04L 41/5067* (2013.01); *H04L 47/193* (2013.01);
(Continued)

(58) Field of Classification Search
CPC .......................... H04L 65/608; H04L 41/5067
(Continued)

(56) References Cited

U.S. PATENT DOCUMENTS 7,289,506 B1 * 10/2007 Hannuksela ... H04N 21/234327
370/394
8,205,004 B1 * 6/2012 Kaufman .............. H04L 65/607
375/240
(Continued)

FOREIGN PATENT DOCUMENTS

CN    101083568 A    12/2007
CN    101170827 A    4/2008
(Continued)

OTHER PUBLICATIONS

Partial English Translation and Abstract of Chinese Patent Application No. CN102223260A, Jun. 20, 2014, 6 pages.
(Continued)

*Primary Examiner* — Karen Tang
(74) *Attorney, Agent, or Firm* — Conley Rose, P.C.

(57) ABSTRACT

A method for evaluating streaming media transmission quality is provided. Initial playback delay information is obtained, and a subjective experience variation value of a user terminal is calculated according to the initial playback delay information, so as to evaluate streaming media transmission quality. The method includes: monitoring a Transmission Control Protocol (TCP) connection established with a user terminal; obtaining initial playback delay information if it is detected that the TCP connection established with the user terminal is a streaming media service connection; and calculating a subjective experience variation value of the user terminal according to the initial playback delay information. A device for evaluating streaming media transmission quality, a method for obtaining streaming media information, and a related device and system are also provided.

17 Claims, 8 Drawing Sheets

(51) Int. Cl.
*H04L 12/24* (2006.01)
*H04L 12/801* (2013.01)
*H04L 12/26* (2006.01)
*H04N 21/442* (2011.01)

(52) U.S. Cl.
CPC .......... *H04L 65/80* (2013.01); *H04L 43/0829* (2013.01); *H04L 43/0852* (2013.01); *H04L 43/0888* (2013.01); *H04L 43/16* (2013.01); *H04L 65/4084* (2013.01); *H04L 65/602* (2013.01); *H04L 69/16* (2013.01); *H04N 21/44209* (2013.01)

(58) Field of Classification Search
USPC ......................................................... 709/231
See application file for complete search history.

(56) References Cited

U.S. PATENT DOCUMENTS

| | | | |
|---|---|---|---|
| 2002/0077786 A1* | 6/2002 | Vogel | H04L 12/2602 702/188 |
| 2003/0131301 A1 | 7/2003 | Shimono et al. | |
| 2004/0098748 A1* | 5/2004 | Bo | H04N 7/17336 725/105 |
| 2005/0089043 A1 | 4/2005 | Seckin et al. | |
| 2006/0165166 A1* | 7/2006 | Chou | H04N 21/23406 375/240.05 |
| 2007/0115814 A1* | 5/2007 | Gerla | H04L 1/0002 370/230 |
| 2007/0124494 A1 | 5/2007 | Harris | |
| 2008/0037420 A1* | 2/2008 | Tang | H04L 1/1607 370/229 |
| 2010/0315958 A1* | 12/2010 | Luo | H04L 12/2602 370/248 |
| 2011/0007648 A1 | 1/2011 | Liu et al. | |
| 2011/0090922 A1 | 4/2011 | Wang et al. | |
| 2011/0213827 A1* | 9/2011 | Kaspar | H04W 76/025 709/203 |
| 2011/0246659 A1* | 10/2011 | Bouazizi | H04N 21/2343 709/231 |
| 2013/0067109 A1* | 3/2013 | Dong | H04L 65/4069 709/231 |

FOREIGN PATENT DOCUMENTS

| | | |
|---|---|---|
| CN | 101425935 A | 5/2009 |
| CN | 101577631 A | 11/2009 |
| CN | 101621351 A | 1/2010 |
| CN | 101783754 A | 7/2010 |
| CN | 102223260 A | 10/2011 |

OTHER PUBLICATIONS

Partial English Translation and Abstract of Chinese Patent Application No. CN101170827, Jul. 24, 2014, 15 pages.
Partial English Translation and Abstract of Chinese Patent Application No. CN101425935, dated Jul. 24, 2014, 27 pages.
Partial English Translation and Abstract of Chinese Patent Application No. CN101783754, dated Jul. 24, 2014, 18 pages.
"3rd Generation Partnership Project; Technical Specification Group Services and System Aspects; Transparent end-to-end Packet-Switched Streaming Service (PSS); Progressive Download and Dynamic Adaptive Streaming over HTTP (3GP-DASH), (Release 10)," 3GPP TS 26.247, V10.0.0, Technical Specification, Jun. 2011, 94 pages.
"3rd Generation Partnership Project; Technical Specification Group Services and System Aspects; Transparent end-to-end Packet-Switched Streaming Service (PSS); Protocols and Codecs (Release 7)," 3GPP TS 26.234, V7.4.0, Sep. 2007, 149 pages.
"Speech and Multimedia Transmission Quality (STQ); QoS aspects for Popular Services in GSM and 3G Networks; Part 2: Definition of Quality of Service Parameters and their Computation," ETSI TS 102 250-2, V1.7.1, Technical Specification, Oct. 2009, 231 pages.
Welch, J., et al., "A proposed Media Delivery Index (MDI)," RFC 4445, Apr. 2006, 10 pages.
Foreign Communication From a Counterpart Application, PCT Application No. PCT/CN2012/084076, English Translation of International Search Report dated Jan. 31, 2013, 2 pages.
Foreign Communication From a Counterpart Application, PCT Application No. PCT/CN2012/084076, English Translation of Written Opinion dated Jan. 31, 2013, 14 pages.
Park, J., et al., "TCP-ROME: A Transport-Layer Parallel Streaming Protocol for Real-Time Online Multimedia Environments," XP011423876, Journal of Communications and Networks, vol. 13, No. 3, Jun. 2011, pp. 277-285.
Vleeschauwer, B., et al., "Enabling Autonomic Access Network QoE Management through TCP Connection Monitoring," XP055141704, 1st IEEE Workshop on Autonomic Communications and Network Management (ACNM'07), May 2007, pp. 56-63.
Foreign Communication From a Counterpart Application, European Application No. 12845763.7, Extended European Search Report dated Sep. 30, 2014, 8 pages.

* cited by examiner

METHOD FOR EVALUATING STREAMING MEDIA TRANSMISSION QUALITY AND OBTAINING INFORMATION, AND RELATED DEVICE AND SYSTEM

CROSS-REFERENCE TO RELATED APPLICATIONS

This application is a continuation of International Application No. PCT/CN2012/084076, filed on Nov. 5, 2012, which claims priority to Chinese Patent Application No. 201110345066.0, filed on Nov. 4, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of media transmission technologies, and in particular, to a method for evaluating streaming media transmission quality and obtaining information, and a related device and system.

BACKGROUND

With the development of multimedia communications technologies, a variety of multimedia services constantly emerge. Therefore, multimedia service quality plays an essential role in fields such as multimedia processing and multimedia communication.

In a traditional network device performance test, people are usually concerned only with forwarding performance of a device itself and quality of service (QoS) of a protocol (e.g. an Internet Protocol (IP)) for interconnection between networks, for example, indicators such as a throughput rate, a packet loss rate, and a delay. In terms of an implementation manner, a network device generally applies different priority policies to traffic of different service types, so as to ensure that each type of service flows is processed in a most appropriate way. For example, a voice flow is very sensitive to a delay and therefore is usually assigned with a relatively high priority; however, a data flow (such as file transmission or an email) has a low requirement for real-time performance and therefore may be assigned with a relatively low priority. Consumers of a multimedia service usually do not concern a priority of traffic or the number of lost data packets. They are more concerned about whether a Voice over IP (VoIP) call is clear, whether a video program plays fluently, and whether an image is clear. VoIP is used to digitize an analog voice signal (Voice) for real-time transmission on an IP data network (IP Network) in a form of a data packet. From this perspective, how to ensure user experience quality is a key factor that really needs to be considered during network device development and testing. Therefore, it is very important for a network device manufacturer to strictly test a device of the manufacturer in a laboratory and formulate, by simulating a real network environment and characteristics of a user service flow, methods and indicators for Quality of Experience (QoE) measurement. QoE can be understood as user experience or user perception, that is, a user's subjective feeling on performance of a streaming media service.

Currently, there is no effective solution for monitoring playback quality of streaming media that is established based on the Transmission Control Protocol (TCP). For example, for the most widely-used Hypertext Transfer Protocol (HTTP) streaming media that is based on the TCP protocol, it is necessary to propose a QoE measurement method and indicator to measure user experience on streaming media quality.

SUMMARY

Embodiments of the present invention provide a method for evaluating streaming media transmission quality, and a related device. Initial playback delay information is obtained, and a subjective experience variation value of a user terminal is calculated according to the initial playback delay information, so as to evaluate streaming media transmission quality.

A method for evaluating streaming media transmission quality includes: monitoring a TCP connection established with a user terminal; obtaining initial playback delay information if it is detected that the TCP connection established with the user terminal is a streaming media service connection; and calculating a subjective experience variation value of the user terminal according to the initial playback delay information.

A device for evaluating streaming media transmission quality includes: a monitoring module configured to monitor a TCP connection established with a user terminal; a first obtaining module configured to obtain initial playback delay information if the monitoring module detects that the TCP connection established with the user terminal is a streaming media service connection; and a first calculating module configured to calculate a subjective experience variation value of the user terminal according to the initial playback delay information that is obtained by the first obtaining module.

The embodiments of the present invention further provide a method for obtaining streaming media information, and a related device and system. Initial playback delay information is obtained, and the initial playback delay information is reported to a server, so that the server may calculate a subjective experience variation value or some other values of the user terminal according to the initial playback delay information.

A method for obtaining streaming media information includes: receiving a request input by a user; obtaining initial playback delay information if the request is a streaming media initial playback request, where the initial playback request is used to establish a streaming media playback connection based on TCP; and reporting the initial playback delay information to a server.

A user terminal includes: a receiving module configured to receive a request input by a user; a second obtaining module configured to obtain initial playback delay information if the request received by the receiving module is a streaming media initial playback request, where the initial playback request is used to establish a streaming media playback connection based on TCP; and a reporting module configured to report the initial playback delay information obtained by the second obtaining module to a server.

A system for obtaining streaming media information includes: a user terminal configured to receive a request input by a user; obtain initial playback delay information if the request is a streaming media initial playback request, where the initial playback request is used to establish a streaming media playback connection based on TCP; and report the initial playback delay information to a server; and the server configured to receive the initial playback delay information reported by the user terminal.

It can be seen from the foregoing technical solutions that, in the method for evaluating streaming media transmission quality and the related device that are provided by the embodiments of the present invention, a TCP connection established with a user terminal is monitored; initial playback delay information is obtained if it is detected that the TCP connection established with the user terminal is a streaming media service connection; and a subjective experience variation value of the user terminal is calculated according to the initial playback delay information, so as to evaluate streaming media transmission quality, such as fluency of a video playback process. In the method for obtaining streaming media information and the related device and system that are further provided by the embodiments of the present invention, initial playback delay information is obtained when it is determined that a received request that is input by a user is a streaming media initial playback request, where the initial playback request is used to establish a streaming media playback connection based on TCP; then the initial playback delay information is reported to a server; and the server may calculate a subjective experience variation value of the user terminal according to the initial playback delay information, so that streaming media transmission quality may also be evaluated.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

An embodiment of the present invention provides a method for evaluating streaming media transmission quality, where the method is used to evaluate TCP streaming media transmission quality. For ease of understanding, in this embodiment of the present invention, analysis is performed for the most widely-used HTTP streaming media that is based on the TCP protocol. It can be understood that the method also applies to other streaming media services that use TCP transmission.

Figure 1:
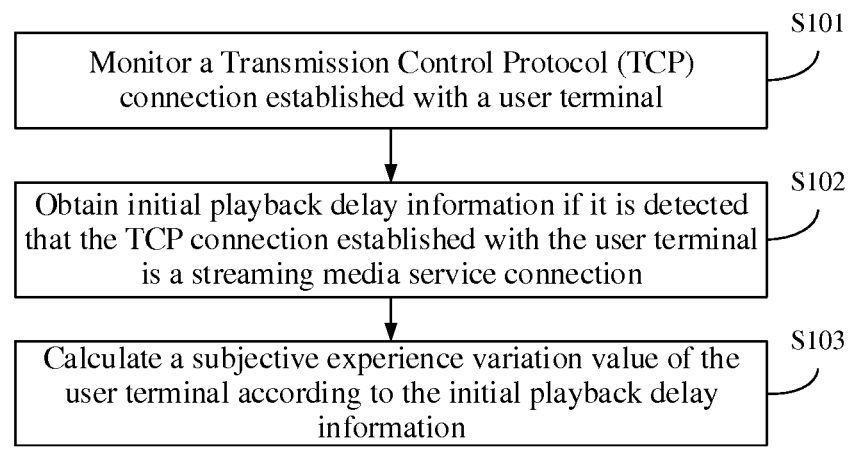
FIG. 1 is a flowchart of a method for evaluating streaming media transmission quality according to an embodiment of the present invention.

Referring to FIG. 1, FIG. 1 is a flowchart of the method, where the method includes:

S101: Monitor a TCP connection established with a user terminal.

S102: Obtain initial playback delay information if it is detected that the TCP connection established with the user terminal is a streaming media service connection.

In some implementation manners, step S101 and step S102 may be summarized as monitoring a TCP connection established with a user terminal, where a monitoring point may be a probe or another monitoring point, and the monitoring point determines a connection of a streaming media service from the TCP connection.

It can be understood that HTTP streaming media based on TCP transmission may include Progressive Download streaming media or HTTP-based dynamic adaptive streaming over media HTTP (DASH).

It should be noted that, if it needs to be determined whether a service is a streaming media service, it may need to be determined whether the service complies with a protocol, and a streaming media service type needs to be determined, and so on. If it needs to be determined whether a service is an HTTP streaming media service, it may need to be determined whether the service complies with the HTTP protocol, and an HTTP streaming media service type needs to be determined, and so on.

The obtaining initial playback delay information may be, after it is determined that the TCP connection established with the user terminal is a streaming media service connection, obtaining time when the TCP connection is established, obtaining time when the user terminal starts to play a video, and calculating an initial playback delay according to the time when the TCP connection is established and the time when the user terminal starts to play the video. In this embodiment of the present invention, a difference between the time when the TCP connection corresponding to the streaming media service is established and the time when the user terminal starts to play the video may be considered as the initial playback delay.

S103: Calculate a subjective experience variation value of the user terminal according to the initial playback delay information.

The subjective experience variation value of the user terminal is calculated according to the initial playback delay in the initial playback delay information, where the subjective experience variation value may be used to evaluate streaming media transmission quality.

To sum up, in the method for evaluating streaming media transmission quality provided by this embodiment of the present invention, a TCP connection established with a user terminal is monitored; initial playback delay information is obtained if it is detected that the TCP connection established with the user terminal is a streaming media service connection; and a subjective experience variation value of the user terminal is calculated according to the obtained initial playback delay information, so as to evaluate streaming media transmission quality.

To further understand the technical solution of this embodiment of the present invention, an application scenario in which a monitoring point is a probe and Progressive Download streaming media transmission quality is determined is used for description below.

Figure 2:
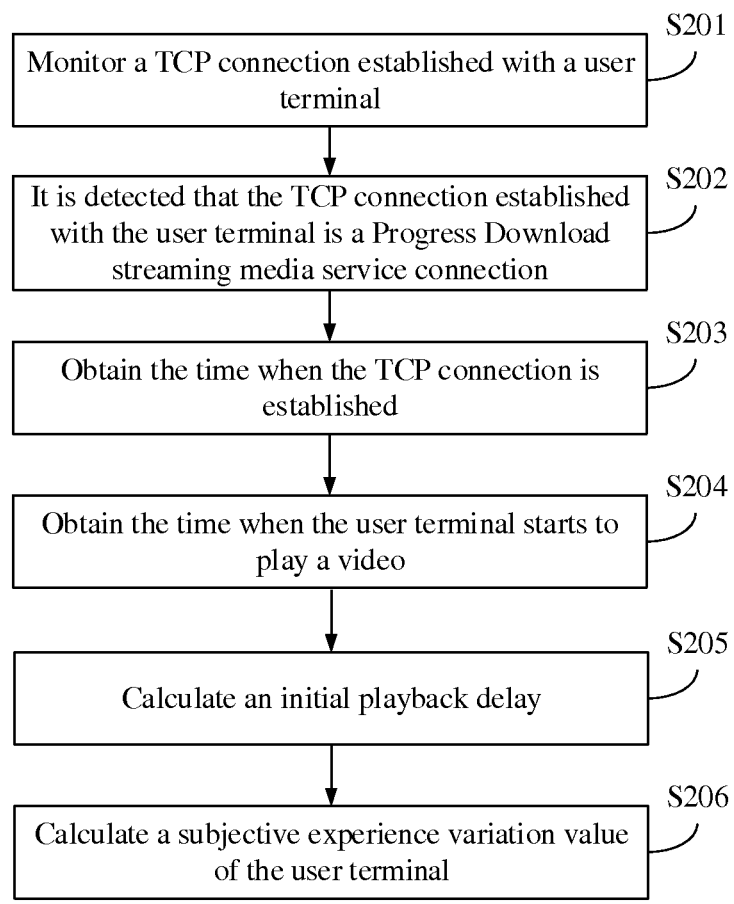
FIG. 2 is a flowchart of a method for evaluating streaming media transmission quality according to another embodiment of the present invention.

Referring to FIG. 2, FIG. 2 is a flowchart of the method, where the method includes:

S201: Monitor a TCP connection established with a user terminal.

S202: It is detected that the TCP connection established with the user terminal is a Progressive Download streaming media service connection.

In some implementation manners, step S201 and step S202 may be summarized as that a probe may receive a network traffic mirror and monitor, in the network traffic mirror, a TCP connection established with a user terminal, and determines that the TCP connection established with the user terminal is a Progressive Download streaming media service connection.

It can be understood that Progressive Download streaming media is one of HTTP streaming media, where a determination process may include: determining the HTTP protocol by using a port number, where port numbers commonly used for HTTP are generally 80/8080/3128/8081/9080; next, determining a type of an HTTP streaming media service, by means of an HTTP request/response Request/Response, and/or whether a status code is 200, and/or a content-type type, where a content-type attribute specifies an HTTP content type of a response, and a content-type of an HTTP streaming media service is generally flash video (video/flv), Internet media flash video (video/x-flv), Internation Organization for Standardization (ISO) flash video (video/f4v), Moving Pictures Expert Group video (video/mp4), Third Generation Partnership Project video (video/3GP), application/octet-stream, or the like.

S203: Obtain the time when the TCP connection is established.

Obtain the time when the TCP connection is established as time when a user requests watching a video, where an obtaining manner may be using time of a first handshake for establishing a TCP connection in an HTTP GET method for requesting a video file as the time $T_{(TCP\ SYN)}$ when the user requests watching the video, where the TCP connection is a TCP connection of the Progressive Download streaming media service in this embodiment.

S204: Obtain the time when the user terminal starts to play a video.

That the user terminal has received a data packet may be determined by using an acknowledgment number Acknowledgement (ACK) of a TCP data packet. ACK is an acknowledgment flag in a header of the TCP data packet, and acknowledges a received TCP packet. Time when a size of a TCP data packet received by the user terminal is larger than a buffering threshold is used as the time $T_{(1st\ display)}$ when the video starts to play, where the TCP connection is a TCP connection of the Progressive Download streaming media service in this embodiment.

S205: Calculate an initial playback delay.

According to the time $T_{(TCP\ SYN)}$ when the user requests watching the video, which is obtained in step S203, and the time $T_{(1st\ display)}$ when the video starts to play, which is obtained in step S204, the initial playback delay $T_{(Initial\ Playback\ Delay)}$ is calculated, where a calculation process is as follows:

$$T_{(Initial\ Playback\ Delay)} = T_{(TCP\ SYN)} - T_{(1st\ display)}.$$

It can be understood that step S203 to step S205 are a process of obtaining initial playback delay information, that is, the initial playback delay information may include the time when the user requests watching the video, the time when the video starts to play, and the initial playback delay.

S206: Calculate a subjective experience variation value of the user terminal.

The subjective experience variation value ΔQoE of the user terminal is calculated according to the initial playback delay obtained in step S205. In this embodiment of the present invention, QoE can be understood as user experience or user perception, that is, subjective feeling of the user terminal on performance of the Progressive Download streaming media service in this embodiment, where a calculation process is as follows:

$$\Delta QoE = \alpha \times T_{(Initial\ Playback\ Delay)},$$

where: $T_{(Initial\ Playback\ Delay)}$ is the initial playback delay, and α is a model parameter, where α may be set to −0.021.

In this embodiment of the present invention, an application scenario in which a monitoring point is a probe and Progressive Download streaming media transmission quality is determined is used to describe the method for evaluating streaming media transmission quality provided by the present invention. Similarly, a TCP connection established with a user terminal may be monitored; initial playback delay information is obtained if it is detected that the TCP connection established with the user terminal is a streaming media service connection; and a subjective experience variation value of the user terminal is calculated according to the obtained initial playback delay information, so as to evaluate Progressive Download streaming media transmission quality.

Similarly, when a probe is in a DASH streaming media scenario, the method provided by the present invention may also be used to evaluate DASH streaming media transmission quality.

Figure 3:
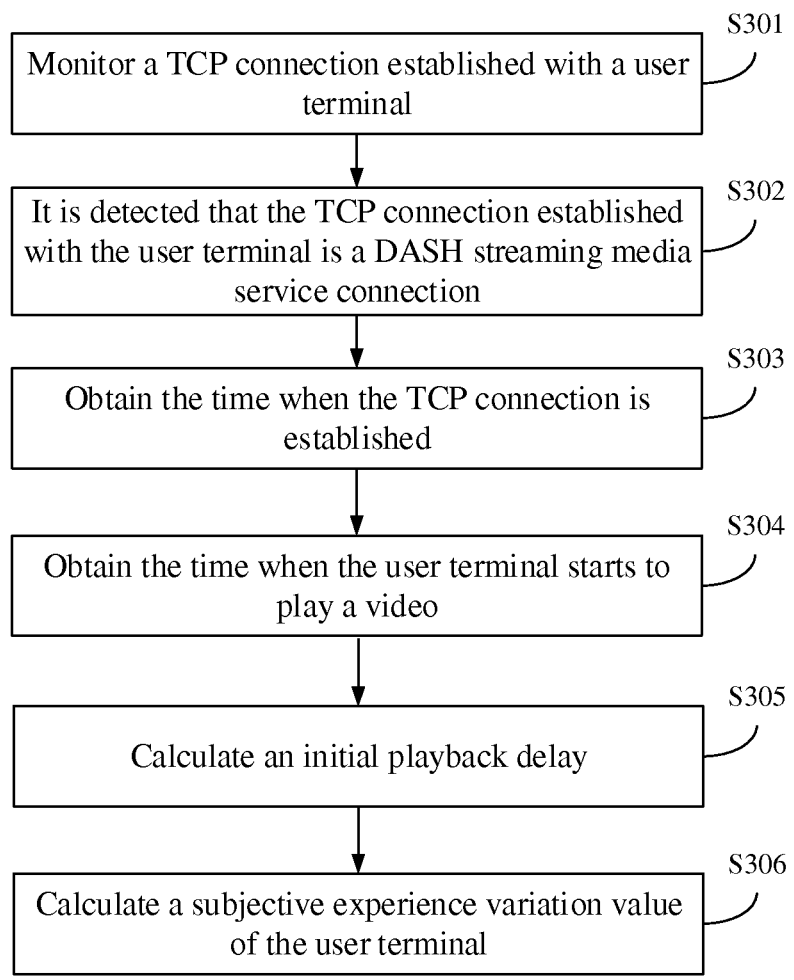
FIG. 3 is a flowchart of a method for evaluating streaming media transmission quality according to another embodiment of the present invention.

Referring to FIG. 3, FIG. 3 is a flowchart of the method, where the method includes:

S301: Monitor a TCP connection established with a user terminal.

S302: It is detected that the TCP connection established with the user terminal is a DASH streaming media service connection.

In some implementation manners, step S301 and step S302 may be summarized as that a probe may receive a network traffic mirror and monitor, in the network traffic mirror, a TCP connection established with a user terminal, and determines that the TCP connection established with the user terminal is a DASH streaming media service connection.

It can be understood that DASH streaming media is one of HTTP streaming media, where a determination process may include: determining the HTTP protocol by using a port number, where port numbers commonly used for HTTP are generally 80/8080/3128/8081/9080; next, determining a Media Presentation Description (MPD) and/or an MPD delta file of DASH, by means of an HTTP Request/Response, and/or whether a status code is 200, and/or a content-type type, where a content-type of an MPD is DASH Extensible Markup Language (dash+xml) or Vendor-Specific Moving Pictures Expert Group (MPEG) DASH MPD (vnd.mpeg-.dash.mpd), and a content-type of an MPD delta file may be Delta DASH Extensible Markup Language (deltadash+xml); then, determining a media segment of DASH, by means of an HTTP Request/Response, and/or whether a status code is 200, and/or a content-type type, where a content-type of a segment is Vendor-Specific Third Generation Partnership Project Segment video (video/vnd.3gpp.segment), video/flv, video/x-flv, video/f4v, video/mp4, video/3gp, application/octet-stream, or the like.

S303: Obtain the time when the TCP connection is established.

S304: Obtain the time when the user terminal starts to play a video.

S305: Calculate an initial playback delay.

S306: Calculate a subjective experience variation value of the user terminal.

For specific operations of step S303 to step S306, reference may be made to content described in step S203 to step S206, and details are not repeatedly described herein. It should be noted that this embodiment is described in a DASH streaming media scenario. Therefore, the TCP connection of the Progressive Download streaming media or Progressive Download streaming media service involved in step S203 to step S206 is correspondingly described as a TCP connection of DASH streaming media or a DASH streaming media service in this embodiment.

In this embodiment of the present invention, an application scenario in which a monitoring point is a probe and DASH streaming media transmission quality is determined is used to describe the method for evaluating streaming media transmission quality provided by the present invention. Similarly, a TCP connection established with a user terminal may be monitored; initial playback delay information is obtained if it is detected that the TCP connection established with the user terminal is a streaming media service connection; and a subjective experience variation value of the user terminal is calculated according to the obtained initial playback delay information, so as to evaluate DASH streaming media transmission quality.

To better implement the technical solution of this embodiment of the present invention, an embodiment of the present invention further provides a related device for implementing the foregoing solution.

Figure 4:
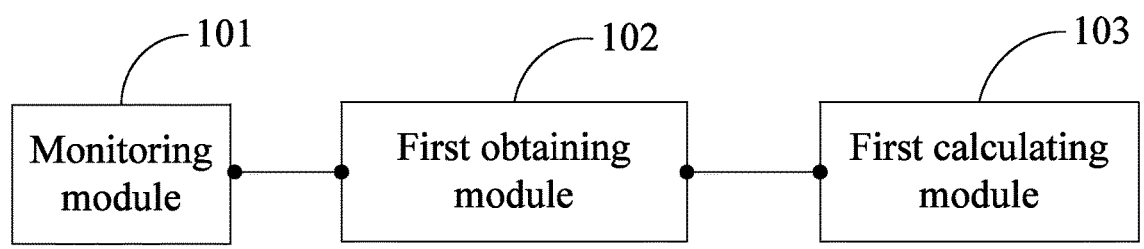
FIG. 4 is a structural block diagram of a device for evaluating streaming media transmission quality according to an embodiment of the present invention.

As shown in FIG. 4, this embodiment of the present invention provides a device for evaluating streaming media transmission quality, including: a monitoring module 101 configured to monitor a TCP connection established with a user terminal; a first obtaining module 102 configured to obtain initial playback delay information if the monitoring module 101 detects that the TCP connection established with the user terminal is a streaming media service connection; and a first calculating module 103 configured to calculate a subjective experience variation value of the user terminal according to the initial playback delay information obtained by the first obtaining module 102.

Figure 5:
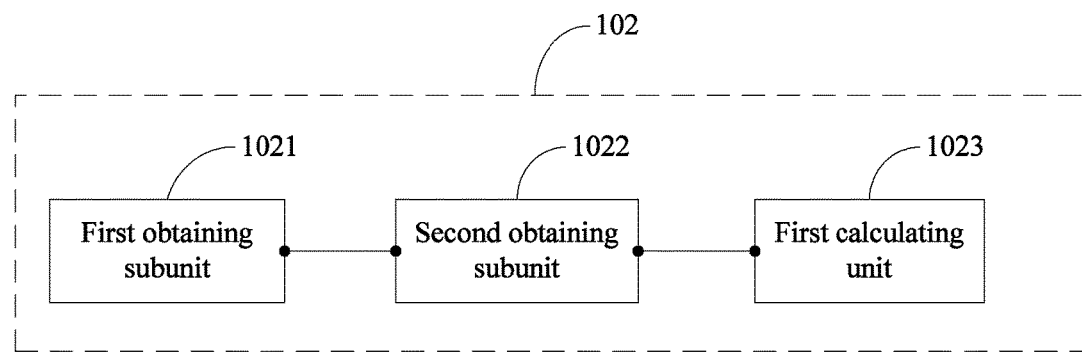
FIG. 5 is a structural block diagram of a first obtaining module of the device according to FIG. 4.

Further, as shown in FIG. 5, the first obtaining module 102 further includes: a first obtaining subunit 1021 configured to obtain time when the TCP connection is established; a second obtaining subunit 1022 configured to obtain time when the user terminal starts to play a video; a first calculating unit 1023 configured to calculate the time when the TCP connection is established, which is obtained by the first obtaining subunit 1021, and the time when the user terminal starts to play the video, which is obtained by the second obtaining subunit 1022, where a difference between the two is the initial playback delay.

According to the device for evaluating streaming media transmission quality in this embodiment, a subjective experience variation value of a user terminal may be calculated according to obtained initial playback delay information, so as to evaluate streaming media transmission quality. It can be understood that functions of all function modules may be specifically implemented according to the method in the foregoing method embodiment. For a specific implementation process, reference may be made to related description of the foregoing method embodiment, and details are not repeatedly described herein.

Figure 6:
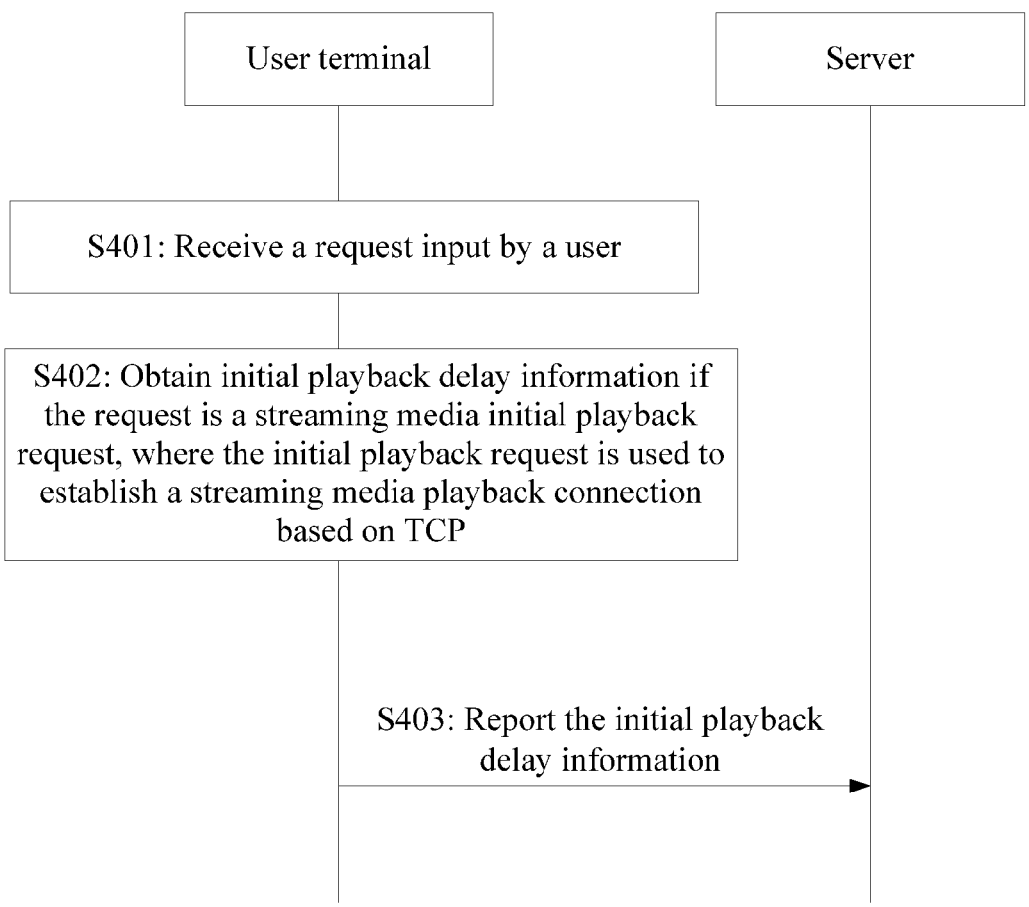
FIG. 6 is a flowchart of a method for obtaining streaming media information according to an embodiment of the present invention.

An embodiment of the present invention further provides a method for obtaining streaming media information. From the perspective of a user terminal, when it is determined that a request input by a user is an initial playback request and the initial playback request is used to establish a streaming media playback connection based on TCP, initial playback delay information is obtained, and the obtained initial playback delay information is reported to a server. It can be understood that, in this embodiment of the present invention, analysis is performed for the most widely-used HTTP streaming media that is based on the TCP protocol. The method also applies to other streaming media services that use TCP transmission, and includes the following steps, as shown in FIG. 6:

S401: Receive a request input by a user.

S402: Obtain initial playback delay information if the request is a streaming media initial playback request, where the initial playback request is used to establish a streaming media playback connection based on TCP.

In some implementation manners, step S401 and step S402 may be summarized as that, after a request input by a user is received, it is determined whether the request is a streaming media initial playback request, where the initial playback request is used to establish a streaming media playback connection based on TCP. It can be understood that, in this embodiment, HTTP streaming media based on TCP transmission may include Progressive Download streaming media or DASH streaming media.

In some implementation manners, if it is determined that the request is a Progressive Download streaming media initial playback request, that is, the user terminal establishes a TCP connection with a server and a request corresponding to the TCP connection is used to watch a video, a determination process may include: determining the HTTP protocol by using a port number, where port numbers commonly used for HTTP are generally 80/8080/3128/8081/9080; next, determining a type of an HTTP streaming media service, by means of an HTTP request/response Request/Response, and/or whether a status code is 200, and/or a content-type type, where a content-type attribute specifies an HTTP content type of a response, and a content-type of an HTTP streaming media service is generally video/flv, video/x-flv, video/f4v, video/mp4, video/3gp, application/octet-stream, or the like.

In some implementation manners, if it is determined that the request is a DASH streaming media initial playback request, that is, the user terminal establishes a TCP connection with a server and a request corresponding to the TCP connection is used to watch a video, a determination process may include: determining an HTTP protocol by using a port number, where port numbers commonly used for HTTP are generally 80/8080/3128/8081/9080; next, determining an MPD and/or an MPD delta file of DASH, by means of an HTTP Request/Response, and/or whether a status code is 200, and/or a content-type type, where a content-type of an MPD is dash+xml or vnd.mpeg.dash.mpd, and a content-type of an MPD delta file may be deltadash+xml; then, determining a media segment of DASH, by means of an HTTP Request/Response, and/or whether a status code is 200, and/or a content-type type, where a content-type of a segment is video/vnd.3gpp.segment, video/flv, video/x-flv, video/f4v, video/mp4, video/3gp, application/octet-stream, or the like.

The obtaining initial playback delay information may be, after it is determined that the request is a streaming media initial playback request and the initial playback request is used to establish a streaming media playback connection based on TCP, obtaining the time when the streaming media playback connection is established based on TCP, obtaining the time when the user terminal starts to play a video, and calculating an initial playback delay according to the time when the streaming media playback connection is established based on TCP and the time when the user terminal starts to play the video. In this embodiment of the present invention, a difference between the time when a streaming media playback connection over TCP that corresponds to the streaming media service is established and the time when the user terminal starts to play the video may be used as the initial playback delay.

S403: Report the initial playback delay information to a server.

It can be understood that the initial playback delay in the initial playback delay information is reported to the server. It can be understood that the server receives the initial playback delay reported by the user terminal and may calculate, according to the initial playback delay, an experience variation value $\Delta QoE$ of the user terminal. In this embodiment of the present invention, QoE can be understood as user experience or user perception, that is, subjective feeling of the user terminal on performance of the HTTP streaming media service, where a calculation process is as follows:

$$\Delta QoE = \alpha \times T_{(Initial\ Playback\ Delay)},$$

where: $T_{(Initial\ Playback\ Delay)}$ is the initial playback delay, and $\alpha$ is a model parameter, where $\alpha$ may be set to $-0.021$.

To sum up, in the method for obtaining streaming media information provided by this embodiment of the present invention, obtained initial playback delay information is reported to a server, and the server may calculate a subjective experience variation value of a user terminal according to the received initial playback delay information, and may also evaluate streaming media transmission quality.

Figure 7:
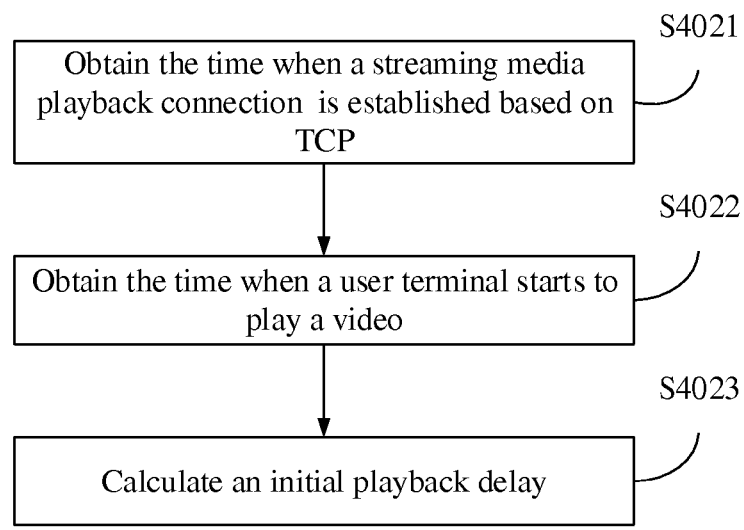
FIG. 7 is a flowchart of a method for obtaining initial playback delay information in the method according to FIG. 6.

Further, if it is determined in step S402 that the request is a streaming media initial playback request and the initial playback request is used to establish a streaming media playback connection based on TCP, the process of obtaining initial playback delay information in step S402 may be summarized as the following steps, as shown in FIG. 7:

S4021: Obtain the time when a streaming media playback connection is established based on TCP.

The time when a streaming media playback connection is established based on TCP is obtained and used as time when a user requests watching a video, where a specific obtaining manner may be using time of a first handshake for establishing a TCP connection in an HTTP GET method for requesting a video file as the time $T_{(TCP\ SYN)}$ when the user requests watching the video.

If the HTTP streaming media is Progressive Download streaming media, the TCP connection is a TCP connection of the Progressive Download streaming media service; and if the HTTP streaming media is DASH streaming media, the TCP connection is a TCP connection of the DASH streaming media service.

S4022: Obtain the time when a user terminal starts to play a video.

Specifically, that the user terminal has received a data packet is determined by using an acknowledgment number ACK of a TCP data packet. ACK is an acknowledgment flag in a header of the TCP data packet, and acknowledges a received TCP packet. Time when a size of a TCP data packet received by the user terminal is larger than a buffering threshold is used as the time $T_{(1st\ display)}$ when the video starts to play.

If the HTTP streaming media is Progressive Download streaming media, the TCP connection is a TCP connection of the Progressive Download streaming media service; and if the HTTP streaming media is DASH streaming media, the TCP connection is a TCP connection of the DASH streaming media service.

S4023: Calculate an initial playback delay.

According to the time $T_{(TCP\ SYN)}$ when the user requests watching the video, which is obtained in step S4021, and the time $T_{(1st\ display)}$ when the video starts to play, which is obtained in step S4022, the initial playback delay $T_{(Initial\ Playback\ Delay)}$ is calculated, where a calculation process is as follows:

$$T_{(Initial\ Playback\ Delay)} = T_{(TCP\ SYN)} - T_{(1st\ display)}.$$

It can be known that step S4021 to step S4023 are a process of obtaining initial playback delay information, that is, the initial playback delay information may include the time when the user requests watching the video, the time when the video starts to play, and the initial playback delay. Then, the calculated initial playback delay is reported to a server, and the server may calculate a subjective experience variation value of the user terminal according to the received initial playback delay, so as to evaluate streaming media transmission quality. Certainly, the server may also calculate other values according to the received initial playback delay, which is not specifically limited herein.

Figure 8:
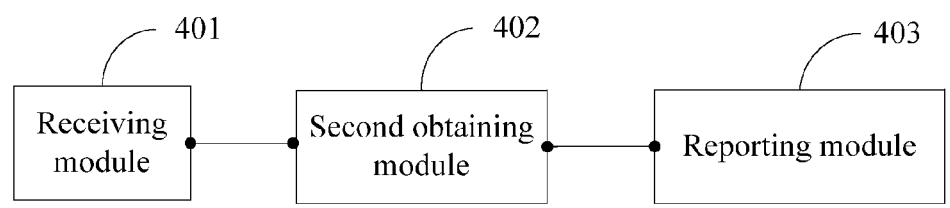
FIG. 8 is a structural block diagram of a user terminal according to an embodiment of the present invention.

Similarly, to better implement the technical solution of the foregoing embodiment, the embodiments of the present invention further provides a related device and system for implementing the foregoing solution. Analysis is as follows, as shown in FIG. 8:

An embodiment of the present invention provides a user terminal, including: a receiving module 401 configured to receive a request input by a user; a second obtaining module 402 configured to obtain initial playback delay information if the request received by the receiving module 401 is a streaming media initial playback request; and a reporting module 403 configured to report the initial playback delay information obtained by the second obtaining module 402 to a server.

Figure 9:
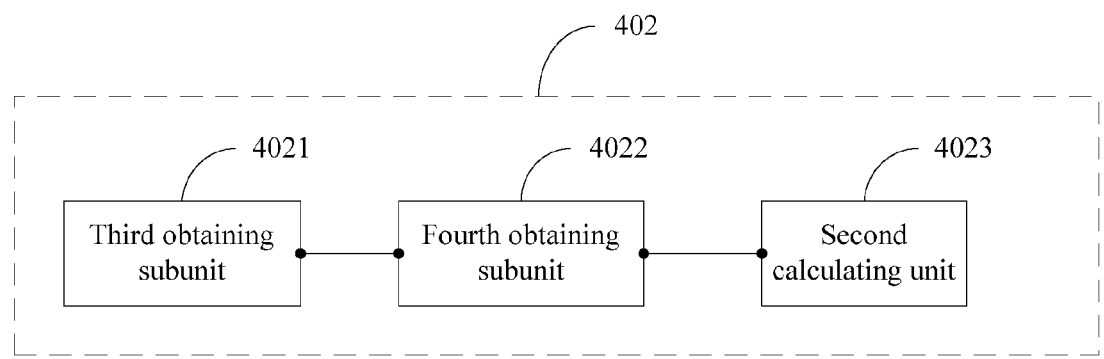
FIG. 9 is a structural block diagram of a second obtaining module of the user terminal according to FIG. 8.

Further, as shown in FIG. 9, the second obtaining module 402 further includes: a third obtaining subunit 4021 configured to obtain time when a streaming media playback connection is established based on TCP; a fourth obtaining subunit 4022 configured to obtain time when a user terminal starts to play a video; and a second calculating unit 4023 configured to calculate the time when the streaming media playback connection is established based on TCP, which is obtained by the third obtaining subunit 4021, and the time when the user terminal starts to play the video, which is obtained by the fourth obtaining subunit 4022, where a difference between the two is the initial playback delay.

According to the user terminal provided by this embodiment of the present invention, when it is determined that a request input by a user is an initial playback request, where the initial playback request is used to establish a streaming media playback connection based on TCP, initial playback delay information is obtained, and the obtained initial playback delay information is reported to a server. Certainly, functions of all function modules of the user terminal in this embodiment of the present invention may be specifically implemented according to the method in the method embodiment for obtaining streaming media information. For a specific implementation process, reference may be made to related description of the foregoing method embodiment, and details are not repeatedly described herein.

Figure 10:
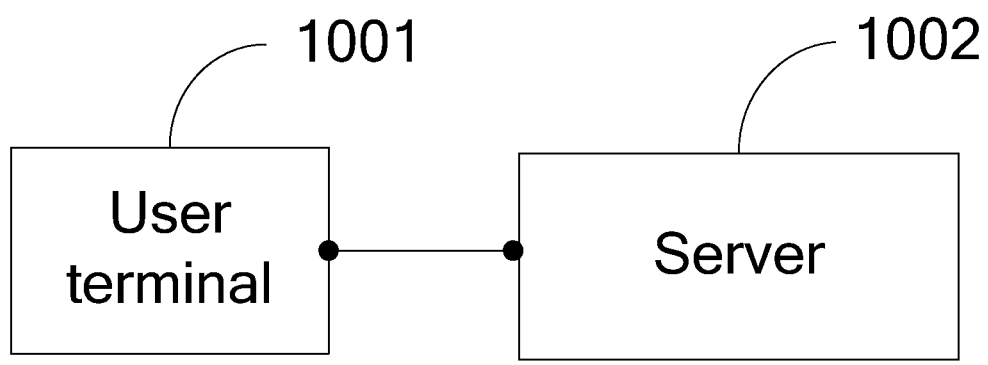
FIG. 10 is a structural block diagram of a system for obtaining streaming media information according to an embodiment of the present invention.

In addition, as shown in FIG. 10, an embodiment of the present invention further provides a system for obtaining streaming media information, including: a user terminal 1001 configured to receive a request input by a user, where initial playback delay information is obtained if the request is a streaming media initial playback request, the initial playback request is used to establish a streaming media playback connection based on TCP, and the initial playback delay information is reported to a server 1002; and the server 1002 configured to receive the initial playback delay information reported by the user terminal 1001.

It can be understood that the server 1002 may calculate a subjective experience variation value of the user terminal 1001 according to the received initial playback delay, so as to evaluate streaming media transmission quality. Certainly, the server 1002 may also calculate other values according to the received initial playback delay, which is not specifically limited herein.

In the system for obtaining streaming media information in this embodiment, when a user terminal determines that a request input by a user is an initial playback request and the initial playback request is used to establish a streaming media playback connection based on TCP, initial playback delay information is obtained; the obtained initial playback delay information is reported to a server; and the server receives the initial playback delay information. Certainly, functions of all function modules of the system for obtaining streaming media information in this embodiment may be specifically implemented according to the method in the method embodiment for obtaining streaming media information. For a specific implementation process, reference may be made to related description of the foregoing method embodiment, and details are not repeatedly described herein.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

The foregoing is detailed description of a method for evaluating streaming media transmission quality and obtaining information, and a related device and system that are provided by the present invention. This specification describes principles and implementation manners of the present invention by using specific examples. Description of the foregoing embodiments is merely intended to help understand the method and core idea of the present invention. Meanwhile, a person of ordinary skill in the art may make a change to a specific implementation manner and an application scope according to the idea of the present invention. To sum up, content of this specification shall not be understood as a limitation on the present invention.

What is claimed is:

1. A method for evaluating streaming media transmission quality, comprising:
    monitoring a Transmission Control Protocol (TCP) connection established with a user terminal;
    obtaining initial playback delay information when it is detected that the TCP connection established with the user terminal is a streaming media service connection, wherein the initial playback delay information comprises a delay from when the TCP connection is established until the user terminal begins to play a video; and
    calculating a subjective experience variation value of the user terminal according to the initial playback delay information,
    wherein calculating the subjective experience variation value of the user terminal according to the initial playback delay information comprises calculating the subjective experience variation value according to an equation:

$$\Delta QoE = \alpha \times T_{InitialPlaybackDelay}, \text{ and}$$

wherein $\Delta QoE$ is the subjective experience variation value, $\alpha$ is a model parameter, and $T_{InitialPlaybackDelay}$ is an initial playback delay.

2. The method according to claim 1, wherein obtaining the initial playback delay information comprises:
    obtaining a time when the TCP connection is established;
    obtaining a time when the user terminal starts to play the video;
    calculating a difference between the time when the TCP connection is established and the time when the user terminal starts to play the video; and
    using the difference as an initial playback delay.

3. The method according to claim 2, wherein obtaining the time when the TCP connection is established comprises obtaining, in Progressive Download streaming media, a time of a first handshake for establishing a TCP connection in a Hypertext Transfer Protocol (HTTP) GET method for requesting a video file.

4. The method according to claim 2, wherein obtaining the time when the TCP connection is established comprises obtaining, in Hypertext Transfer Protocol (HTTP)-based dynamic adaptive streaming over media HTTP (DASH), time of a first handshake for establishing a TCP connection in an HTTP GET method for requesting a media presentation description (MPD), an MPD delta file, or a media segment.

5. The method according to claim 2, wherein obtaining the time when the user terminal starts to play the video comprises obtaining a time when a size of a TCP data packet received by the user terminal is larger than a buffering threshold.

6. The method according to claim 1, wherein the model parameter $\alpha$ is a preset negative number.

7. A device for evaluating streaming media transmission quality, comprising:
    a non-transitory computer readable medium having instructions stored thereon; and a computer processor coupled to the non-transitory computer readable medium and configured to execute the instructions to:
  monitor a Transmission Control Protocol (TCP) connection established with a user terminal;
  obtain initial playback delay information when the monitoring module detects that the TCP connection established with the user terminal is a streaming media service connection, wherein the initial playback delay information comprises a delay from when the TCP connection is established until the user terminal begins to play a video; and
  calculate a subjective experience variation value of the user terminal according to the initial playback delay information,
wherein the computer processor is configured to execute the instructions to calculate the subjective experience variation value of the user terminal according to the initial playback delay information comprises the computer processor being configured to calculate the subjective experience variation value according to an equation:

$$\Delta QoE = \alpha \times T_{InitialPlaybackDelay},$$ and wherein $\Delta QoE$ is the subjective experience variation value, $\alpha$ is a model parameter, and $T_{InitialPlaybackDelay}$ is an initial playback delay.

8. The device according to claim 7, wherein the computer processor is further configured to execute the instructions to:
  obtain a time when the TCP connection is established;
  obtain a time when the user terminal starts to play the video; and
  calculate the time when the TCP connection is established and the time when the user terminal starts to play the video, and
  wherein a difference between the time when the TCP connection is established and the time when the user terminal starts to play the video is an initial playback delay.

9. The device according to claim 7, wherein the model parameter $\alpha$ is a preset negative number.

10. A method for obtaining streaming media information, comprising:
  receiving a request input by a user;
  obtaining initial playback delay information when the request is a streaming media initial playback request, wherein the initial playback request is used to establish a streaming media playback connection based on Transmission Control Protocol (TCP), and wherein the initial playback delay information comprises a delay from when the streaming media playback connection is established until a user terminal begins to play a video;
  reporting the initial playback delay information to a server; and
  calculating a subjective experience variation value according to an equation:

$$\Delta QoE = \alpha \times T_{InitialPlaybackDelay},$$ and wherein $\Delta QoE$ is the subjective experience variation value, $\alpha$ is a model parameter, and $T_{InitialPlaybackDelay}$ is the initial playback delay.

11. The method according to claim 10, wherein obtaining the initial playback delay information comprises:
  obtaining a time when the streaming media playback connection is established based on TCP;
  obtaining a time when the user terminal starts to play the video; and
  calculating an initial playback delay according to the time when the streaming media playback connection is established based on TCP and the time when the user terminal starts to play the video.

12. The method according to claim 11, wherein obtaining the time when the streaming media playback connection is established based on TCP comprises obtaining, in Progressive Download streaming media, time of a first handshake for establishing a TCP connection in a Hypertext Transfer Protocol (HTTP) GET method for requesting a video file.

13. The method according to claim 11, wherein obtaining the time when the streaming media playback connection is established based on TCP comprises obtaining, in dynamic streaming over media Hypertext Transfer Protocol (DASH), time of a first handshake for establishing a TCP connection in a Hypertext Transfer Protocol (HTTP) GET method for requesting a media presentation description (MPD), an MPD delta file, or a media segment.

14. The method according to claim 11, wherein obtaining the time when the user terminal starts to play the video comprises obtaining a time when a size of a TCP data packet received by the user terminal is larger than a buffering threshold.

15. The method according to claim 10, wherein the model parameter $\alpha$ is a preset negative number.

16. A user terminal, comprising:
  a non-transitory computer readable medium having instructions stored thereon; and
  a computer processor coupled to the non-transitory computer readable medium and configured to execute the instructions to:
    receive a request input by a user;
    obtain initial playback delay information when the request is a streaming media initial playback request, wherein the initial playback request is used to establish a streaming media playback connection based on Transmission Control Protocol (TCP), and wherein the initial playback delay information comprises a delay from when the streaming media playback connection is established until a user terminal begins to play a video;
    report the initial playback delay information to a server;
    obtain a time when the streaming media playback connection is established based on TCP;
    obtain a time when the user terminal starts to play the video; and
    calculate the time when the streaming media playback connection is established based on TCP and the time when the user terminal starts to play the video, wherein a difference between the time when the streaming media playback connection is established based on TCP and the time when the user terminal starts to play the video is an initial playback delay; and
    calculate a subjective experience variation value according to an equation:

$$\Delta QoE = \alpha \times T_{InitialPlaybackDelay},$$ and wherein $\Delta QoE$ is the subjective experience variation value, $\alpha$ is a model parameter, and $T_{InitialPlaybackDelay}$ is the initial playback delay.

17. The user terminal according to claim 16, wherein the model parameter $\alpha$ is a preset negative number.

* * * * *